Figure 1:
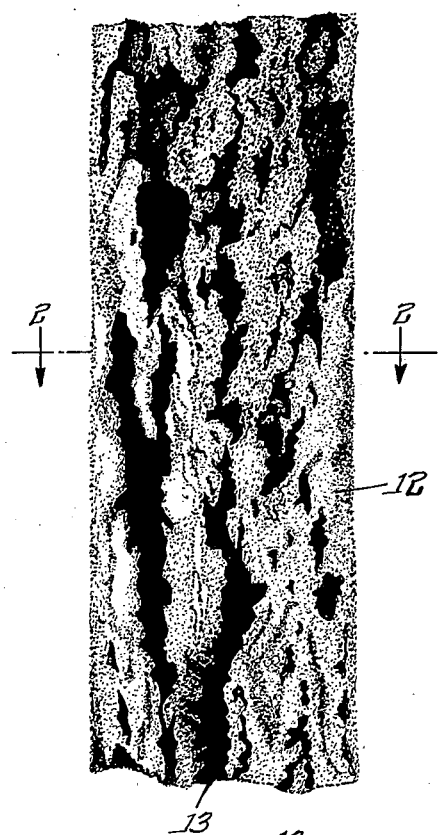

Feb. 8, 1949.  R. U. CLARK  2,461,410

POROUS ELECTRODE FOR ELECTROLYTIC CELLS

Filed Sept. 24, 1945

INVENTOR.
Richard U. Clark
BY Clarence J. Loftus
Atty

Patented Feb. 8, 1949

2,461,410

UNITED STATES PATENT OFFICE 2,461,410

POROUS ELECTRODE FOR ELECTROLYTIC CELLS

Richard U. Clark, Belmont, Mass., assignor to The Magnavox Company, Fort Wayne, Ind., a corporation of Delaware Application September 24, 1945, Serial No. 618,148

8 Claims. (Cl. 175—315)

The present invention relates to electrolytic cells and more particularly to a porous electrode and the method of its manufacture.

Heretofore numerous improvements have been made in electrodes resulting in a high surface factor. In some instances such electrodes have been formed of metal particles bonded under pressure and sintered into a coherent piece. The composition of such electrodes indicated that they were made up of discrete or normally crystal type particles and particles bonded together at spaced points on their surface.

Electrodes made in the foregoing manner have a definite limit to the effective surface factor gain in relation between particle size and porosity which may be achieved. Thus there is present an early limit relative to the particle size reduction from which an effective gain in surface factor for a given amount of material can be obtained. For example this limit appears to be approached at a particle size of about 325 mesh in the instance of electrodes made of tantalum powder. It would appear that this limit probably bears some relation to the packing factors of the discrete particles and to the limitations of bonding as a normal function of pressure required to obtain successful sintering and bonding of the particles into an electrode body.

It would therefore appear that in order to obtain an improvement in the surface factor gain, it is necessary to obtain a new form or type of porosity not at present obtained or claimed for pressed or sintered powdered electrodes. In accordance with the present invention it is possible to obtain a different type or form of porosity by the use of a much smaller size particle arranged in an electrode structure having an irregular pattern of porosity characterized by crevasses, flutes, cracks, etc. which do not appear to weaken seriously the structure of the electrode but which give access and venting to the innumerable pores of the electrode.

It is, therefore, an object of the present invention to provide an improved type of electrode for use in electrolytic cells or condensers of very great capacity but unusually light weight.

Another object of the present invention is to provide an improved electrode having a low voltage film for use in an improved condenser of relatively high capacity.

Another object of the present invention is to provide an improved electrolytic electrode which is relatively porous but does not readily retain gas bubbles.

Still another object of the present invention is to provide an improved electrolytic cell electrode having a greater surface factor for a given porosity.

A still further object of the present invention is to provide an improved electrolytic cell electrode of a metal and metal oxide agglomeration of an amorphous nature.

Still another object of the present invention is to provide a method of manufacturing an improved electrolytic cell electrode.

A still further object of the present invention is to provide an improved electrolytic cell electrode suitable for use with any other type electrode to form a polarized or non-polarized type of condenser.

A still further object of the present invention is to provide an effective electrolytic cell electrode for the construction of electric charge storing cells of condensers of relatively low cost, long useful life, low power factor losses, and a stability of operation under a wide range of temperature conditions.

Figure 2:
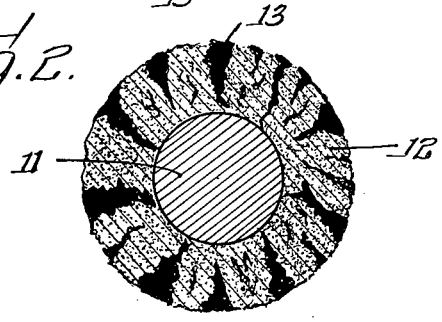

Other and further objects of the present invention subsequently will become apparent by reference to the following description taken in connection with the accompanying drawing wherein:

Figure 1 is a pen and ink reproduction of a photomicrograph of an electrode constructed in accordance with the present invention; and Figure 2 is a cross sectional view of the electrode shown in Figure 1.

In accordance with the present invention an improved electrode structure for electrolytic cells and condensers is obtained by the formation of a relatively thick coat of unreduced metal oxide and porous metal on a base of a refractory type of metal such as tungsten, tantalum, columbium and other valve metals or on a base comprising a normally porous core of discrete crystal particles. The core may be of suitable size and shape for the particular condenser to be constructed, and composed of fairly large particles if desired. The metal oxide layer formed on the base of the electrode is as deep as consistent with reasonable residual strength of the body. The electrode thus formed may then be treated chemically so as to break down the oxides into an amorphous and still more porous form of structure, as for example by exposing the electrode at low temperature to ammonia, or by treating by other known methods used for conversion to an amorphous type structure.

If desired an electrode of such type may be formed by binding or cementing metal salts of a nature suitable for reduction into a metal, metal oxide combination of the desired amorphous form, or applying an amorphous metal body which is readily oxidizable directly on to a suitable metal core. The core which may be of either solid metal or porous metal may be selected so as to be helpful in reducing the metal salts. On the other hand the salts may be mixed with metal particles to aid in the reduction of the salts and the reduction made in vacuum. If desired the reducing metal may be evaporated out of the body after the desired valve metal has been reduced. For example in the case of tantalum salts such as tantalum pentoxide which is generally reduced with aluminum, a percentage of powdered tantalum may be added to the mixture to cut down the amount of aluminum used thus reducing the amount of aluminum that must be evaporated out of the electrode body. The reduction shrinkages that take place upon converting the metal oxide to metal enhance the porosity of the electrode.

In accordance with the present invention one of the mixtures used consisted by weight of three parts of aluminum, four parts of tantalum pentoxide and two parts of tantalum powder, the latter having a particle size of 400 mesh. These powders were well mixed with a binder of amyl acetate thickened by evaporation to a syrup-like consistency. This mixture was built up around a tantalum wire which aided in the sintering process, and made contact to the electrode during several heating cycles in a vacuum chamber. The reduction in the vacuum chamber is obtained while the electrode is under a relatively low mechanical pressure. It is believed that the reduction under low mechanical pressure promotes the high porosity of much finer grain with a relatively large surface area which produces the high capacity electrode when used in a condenser.

The resultant electrode body was several times thicker than the contact wire. The resulting structure is illustrated in the drawing where the tantalum wire core 11 is surrounded by a porous electrode structure 12. This electrode structure has a very irregular pattern of porosity having crevasses, flutes, cracks, etc. represented by the black portions 13 in the drawing. As previously stated these crevasses and cracks do not appear to weaken the structure seriously but do assist in venting the innumerable pores of the electrode. The surface appearance as is apparent from Figure 1 somewhat resembles the structure of very rough bark on a tree.

After the electrode has been formed, and the metal reduced to the desired form, it may be further treated in a suitable electrolyte in order to form thereon a dielectric film in a manner well known in the art. This produces an electrolytic condenser anode of high capacity capabilities suitable for use with another electrode and electrolyte to form a complete condenser. If desired two similar electrodes each carrying an oxide film can be used to form a non-polarized type of condenser. An electrode of the type described may be used with any other type electrode although the preferred combination is with another electrode having a high surface factor.

For operation at very high voltages it has been found advantageous to use a high pressure container with a suitable relief valve, and to include within the container an inert or explosion preventing gas at a pressure of several atmospheres. Such an arrangement permits the formation of condensers for high operating voltages without resorting to a dilute high resistance electrolyte.

Utilizing an anode in the present invention in which the amorphous metal was tungsten and tungsten oxide, it has been possible to obtain condensers with capacities of 10,000 microfarad-volts per gram of amorphous material. This is indicative of the improvement obtained over prior formation of porous electrodes. A corresponding improvement was obtained with tantalum. It furthermore will be appreciated by those skilled in the art that condensers may be made by the use of the improved electrodes having oxide films formed at voltages of several hundred volts where the metal of the anode is one which will produce films at such voltages as is the case with tantalum, columbium and other metals.

The cost of construction of condensers is materially reduced by the formation of electrodes in accordance with the present invention since it is more economical to make the electrode from the cheaper form of valve metal by building up the electrode from the metal salts, since the metal salts are an intermediate product between the ore and pure metal and hence such electrodes are much cheaper than those made from pure metal powders.

While for the purpose of illustrating and describing the present invention certain materials and processes have been used, it is to be understood that such variations in the materials employed in the process of manufacture are contemplated as may be commensurate with the spirit and scope of the following claims.

This invention is hereby claimed as follows:

1. An electrolytic cell electrode comprising a supporting core of valve metal and an adhering surrounding porous mass of film forming metal, said porous mass being the reduction product of a porous mass of film forming metal compound reduced in situ, said surrounding mass having random formations of irregularly shaped crevasses, flutes and cracks extending thereinto.

2. An electrolytic cell electrode comprising a supporting core of valve metal and an adhering surrounding porous mass of film forming metal, said porous mass being the reduction product of a porous mass of film forming metal compound, including metal oxide, reduced in situ, said surrounding mass having random formations of irregularly shaped crevasses, flutes and cracks extending thereinto.

3. An electrolytic cell electrode comprising a supporting core of valve metal and an adhering surrounding porous mass of film forming metal, said porous mass being the reduction product of a porous mass of film forming metal compound, including valve metal oxide and porous metal, reduced in situ, said surrounding mass having random formations of irregularly shaped crevasses, flutes and cracks extending thereinto.

4. An electrolytic condenser electrode comprising a rigid core of discrete crystal particles and a surrounding porous mass of film forming metal, said porous mass being the reduction product of a porous mass of film forming metal compound reduced in situ, said surrounding mass having random formations of irregularly shaped crevasses, flutes and cracks extending thereinto.

5. An electrolytic condenser electrode comprising a rigid core of valve metal and a surrounding porous mass of film forming metal, said porous mass being the reduction product of a porous mass of film forming metal compound, including metal oxide and a powdered valve metal, reduced in situ, said surrounding mass having random formations of irregularly shaped crevasses, flutes and cracks extending thereinto.

6. An electrolytic condenser electrode comprising a rigid core of valve metal and a surrounding porous mass of film forming metal, said porous mass being the reduction product of a porous mass of film forming metal compound, including metal oxide, powdered valve metal and a binder, reduced in situ, said surrounding mass having random formations of irregularly shaped crevasses, flutes and cracks extending thereinto.

7. An electrolytic condenser electrode comprising a rigid core of valve metal and a surrounding porous mass of film forming metal, said porous mass being the reduction product of a porous mass of film forming metal compound, including metal salts suitable for reduction into a metal and metal oxide, reduced in situ, said surrounding mass having random formations of irregularly shaped crevasses, flutes and cracks extending thereinto.

8. An electrolytic condenser electrode comprising a rigid core of valve metal and a surrounding porous mass of film forming metal, said porous mass being the reduction product of a porous mass of film forming metal compound, including valve metal compound and porous metal, reduced in situ, said surrounding mass having random formations of irregularly shaped crevasses, flutes and cracks extending thereinto.

RICHARD U. CLARK.

REFERENCES CITED

The following references are of record in the file of this patent:

UNITED STATES PATENTS

| Number | Name | Date |
|---|---|---|
| 2,177,086 | Williams | Oct. 24, 1939 |
| 2,290,338 | Koehring | July 21, 1942 |
| 2,299,228 | Gray | Oct. 20, 1942 |
| 2,359,970 | Clark | Oct. 10, 1944 |
| 2,361,378 | Brennen | Oct. 31, 1944 |

FOREIGN PATENTS

| Number | Country | Date |
|---|---|---|
| 518,267 | Great Britain | Feb. 22, 1940 |

Certificate of Correction

Patent No. 2,461,410.　　　　　　　　　　　　　　　　　　　　February 8, 1949.

RICHARD U. CLARK

It is hereby certified that error appears in the printed specification of the above numbered patent requiring correction as follows:

Column 2, line 19, for the words "cells of" read *cells or*;

and that the said Letters Patent should be read with this correction therein that the same may conform to the record of the case in the Patent Office.

Signed and sealed this 30th day of August, A. D. 1949.

[SEAL]

THOMAS F. MURPHY,
*Assistant Commissioner of Patents.*